(12) United States Patent
Nishimoto et al.

(10) Patent No.: US 7,057,146 B2
(45) Date of Patent: Jun. 6, 2006

(54) OPTICAL PICKUP HAVING A DIFFRACTION GRATING AND A HOLOGRAM ELEMENT

(75) Inventors: Masahiko Nishimoto, Osaka (JP); Shinichi Hamaguchi, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 349 days.

(21) Appl. No.: 10/390,011

(22) Filed: Mar. 18, 2003

(65) Prior Publication Data

US 2003/0178548 A1 Sep. 25, 2003

(30) Foreign Application Priority Data

Mar. 25, 2002 (JP) ........................................ 2002-083799

(51) Int. Cl.
*G02B 7/04* (2006.01)
(52) U.S. Cl. ................................ 250/201.5; 250/237 G
(58) Field of Classification Search .............. 250/201.5, 250/216, 239, 208.1, 237 G; 369/44.14, 44.23
See application file for complete search history.

(56) References Cited

U.S. PATENT DOCUMENTS 6,512,608 B1 * 1/2003 Ohyama ..................... 359/15

FOREIGN PATENT DOCUMENTS

| JP | 10-222853 | 8/1998 |
|---|---|---|
| JP | 2001-209060 | 8/2001 |
| JP | P2001-229573 A | 8/2001 |

\* cited by examiner

*Primary Examiner*—Que T. Le
(74) *Attorney, Agent, or Firm*—McDermott Will & Emery LLP

(57) ABSTRACT

The optical pickup of this invention includes a diffraction grating for dividing a light beam emitted from a semiconductor laser into a main beam, a precedent sub beam and a subsequent sub beam; a hologram element for dividing reflected light beams of the main beam, the precedent sub beam and the subsequent sub beam from an optical recording medium respectively into first through eighth main beams, first through eighth precedent sub beams and first through eighth subsequent sub beams; a main beam detector for receiving the first through eighth main beams; a precedent sub beam detector for receiving the first through eighth precedent sub beams; and a subsequent sub beam detector for receiving the first through eighth subsequent sub beams.

7 Claims, 9 Drawing Sheets

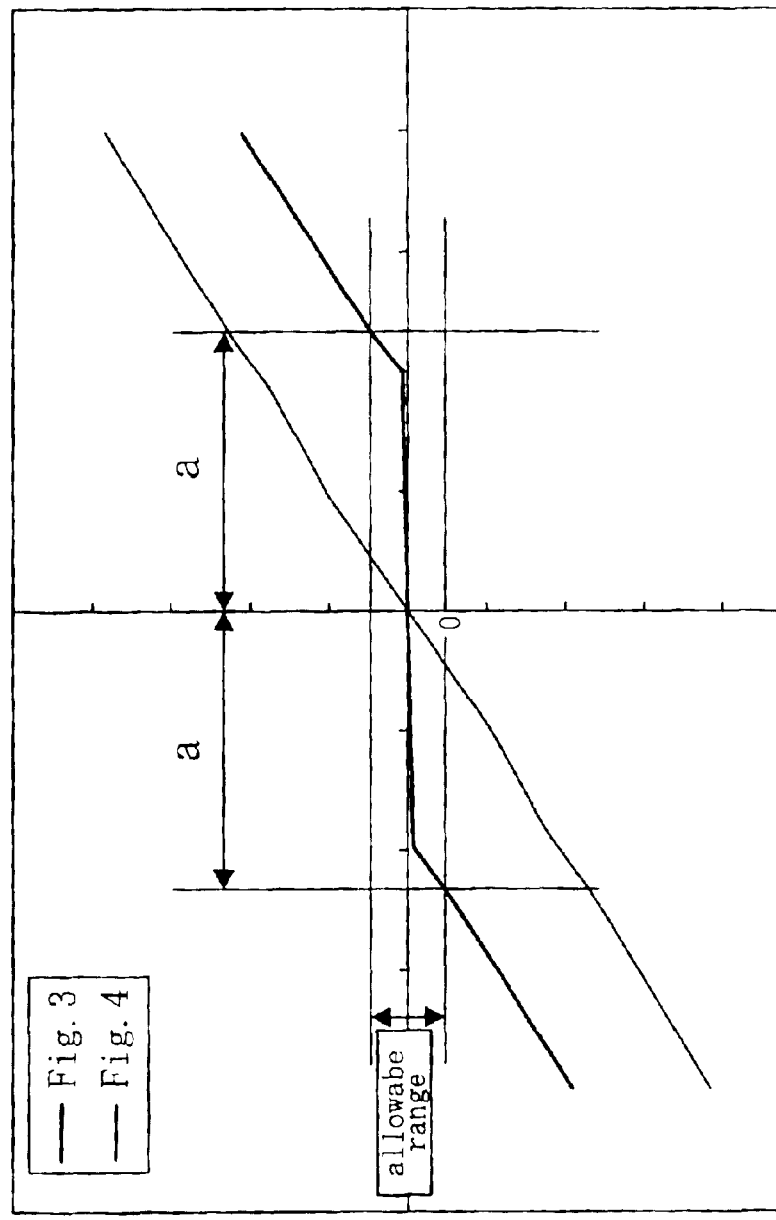

OPTICAL PICKUP HAVING A DIFFRACTION GRATING AND A HOLOGRAM ELEMENT

BACKGROUND OF THE INVENTION

The present invention relates to an optical pickup. More particularly, it relates to an optical pickup for use in an optical recording/reproducing apparatus for reproducing information from an optical recording medium, recording information on an optical recording medium or erasing information from an optical recording medium.

Optical memory technology that uses, as a high density and large capacity recording medium, an optical disk with a pit pattern has been spreading in the application to, for example, digital audio disks, video disks, document file disks and data file disks. In the optical memory technology, information is recorded in and reproduced from an optical disk with high accuracy and high reliability by using finely restricted optical beams. This recording/reproducing operation wholly depends upon the optical system of a recording/reproducing apparatus. The basic functions of an optical pickup, that is, a principal part of the optical system, are roughly classified into the following: a collecting function to form a diffraction limited fine spot; a controlling function for focus control and tracking control of the optical system; and a detecting function for a pit signal. Each of these functions is realized by combining any of various optical systems and photoelectric conversion/detection methods in accordance with the purpose and the use.

In particular, an optical pickup using a hologram element has recently been developed in order to reduce the size and the thickness of the optical pickup. Also, in a conventional technique using a three-beam method for the tracking control, a diffraction element is used for diffracting a light beam into a main beam and a sub beam.

Now, an exemplified conventional technique will be described with reference to FIGS. 8, 9A and 9B. It is noted that, in xyz coordinates shown in these drawings, an identical direction is indicated by using identical axes of the coordinates.

FIG. 8 shows the architecture of a conventional optical pickup. The optical pickup of FIG. 8 includes a semiconductor laser 1, photodetectors 2 and 3, a diffraction element 4, a hologram element 5, a collimator lens 6 and an object lens 7, so as to perform a read operation for reading a pit pattern of an optical disk 8 and the like. This operation will now be described.

An outgoing light beam L0 from the semiconductor laser 1 passes through the diffraction element 4, so as to be divided into a pair of a main beam and a sub beam (not shown) to be used for detecting a tracking error signal. The main beam and the sub beam pass through the hologram element 5, are collected by the collimator lens 6 and enter the object lens 7. Then, the beams are collected on the optical disk 8 by the object lens 7.

A light beam reflected by the optical disk 8 enters the hologram element 5 through the above-described optical path in the reverse direction. At this point, ±1st-order diffracted light beams (L1 and L2) generated by the hologram element 5 respectively enter the photodetectors 2 and 3 to be detected. When the outputs of the photodetectors 2 and 3 are calculated, a focus error signal FE, a servo signal including a tracking error signal TE and an information signal can be obtained.

The structures of the hologram element 5 and the photodetectors 2 and 3 are shown in FIGS. 9A and 9B, respectively. FIGS. 9A and 9B respectively show the plane structures of the hologram element 5 and the photodetectors 2 and 3 taken along the negative direction of the z-axis of FIG. 8 (namely, a direction from the optical disk 8 toward the photodetectors 2 and 3 on the drawing).

The hologram element 5 is a Fresnel zone plate consisting of a single area with a hologram pattern as shown in FIG. 9A. FIG. 9B shows the positional relationship between an apparent light emitting point 1a of the semiconductor laser 1 and the photodetectors 2 and 3.

As shown in FIG. 9B, a detection face of the photodetector 2 is divided into areas 2a, 2b, 2c, 2d and 2e. Also, a detection face of the photodetector 3 is divided into areas 3a, 3b, 3c, 3d and 3e.

As shown in FIG. 8, the diffracted light beams L1 and L2 obtained by the hologram element 5 respectively enter the photodetectors 2 and 3. In FIG. 9B, cross-sections of light beams on the photodetectors 2 and 3 are shown as circles L1a, L1b, L1c, L2a, L2b and L2c. In this case, the cross-sections L1b and L2b correspond to spots of the main beam, and the cross-sections L1a, L1c, L2a and L2c correspond to spots of the sub beam.

Since the hologram element 5 is a Fresnel zone plate, the diffracted light beam L1 is converged on a point in front of the apparent light emitting point 1a of the semiconductor laser 1 (namely, on a point away from the apparent light emitting point 1a in the positive direction of the z-axis and in the perpendicular direction to the face of the drawing). Also, the diffracted light beam L2 is converged on a point behind of the apparent light emitting point 1a (namely, on a point away from the apparent light emitting point 1a in the negative direction of the z-axis).

The focus error signal FE is detected by a known SSD (spot size detection) method utilizing this difference in the convergence points. In other words, the focus error signal FE is obtained through calculation of the following equation 1, wherein the reference numerals of the respective detection areas of the photodetectors 2 and 3 are used to indicate output values of the corresponding detection areas:

$$FE=(2c-2b-2d)-(3c-3b-3d) \qquad \text{Equation 1}$$

On the other hand, the tracking error signal TE is detected by a known three-beam method. In other words, the tracking error signal TE is obtained through calculation of the following equation 2, wherein the reference numerals of the respective detection areas are used to indicate output values of the corresponding detection areas:

$$TE=(2a+3a)-(2e+3e) \qquad \text{Equation 2}$$

The conventional optical pickup, however, is difficult to apply to reproducing or recording operations for various optical recording mediums with different physical formats, such as CDs, DVD-ROMs and DVD-RAMs. As a countermeasure against this problem, Japanese Laid-Open Patent Publication No. 2001-229573 discloses an optical pickup applicable to reproducing or recording operations for various optical recording mediums with different physical formats, which is insufficient in the reliability. Specifically, in the optical pickup disclosed in this publication, the shift of a light spot is largely restricted, and for example, the shift of merely approximately 0.1 mm is allowable. Therefore, there arises another problem that it is actually not easy to mass-produce optical pickups with the shift at such a low level.

Furthermore, according to Japanese Laid-Open Patent Publication No. 2001-229573, a photodetector, a hologram element and the like are disposed separately from a semiconductor laser (light source). Therefore, it is very difficult to align respective elements of the optical system with a small shift. Also, since the semiconductor laser (light source) is separately disposed, this pickup is disadvantageously easily affected by vibration.

SUMMARY OF THE INVENTION

The present invention was devised in consideration of the aforementioned conventional disadvantages, and a principal object of the invention is providing an optical pickup that can perform a reproducing or recording operation regardless of the recording format of an optical recording medium and can suppress the problem of positional shift of a light spot.

The optical pickup according to this invention includes a semiconductor laser; a diffraction grating for dividing a light beam emitted by the semiconductor laser into a main beam, a precedent sub beam and a subsequent sub beam; a hologram element for dividing reflected light beams of the main beam, the precedent sub beam and the subsequent sub beam from an optical recording medium respectively into first through eighth main beams, first through eighth precedent sub beams and first through eighth subsequent sub beams; a main beam detector for receiving the first through eighth main beams; a precedent sub beam detector for receiving the first through eighth precedent sub beams; and a subsequent sub beam detector for receiving the first through eighth subsequent sub beams, and the semiconductor laser, the diffraction grating, the hologram element, the main beam detector, the precedent sub beam detector and the subsequent sub beam detector are integrally formed.

Preferably, the main beam detector consists of first through eighth main beam detectors for receiving the first through eighth main beams, and each of the first through eighth main beam detectors has at least two light receiving portions.

Preferably, the precedent sub beam detector consists of first through fourth precedent sub beam detectors for receiving the first through eighth precedent sub beams, and the subsequent sub beam detector consists of first through fourth subsequent sub beam detectors for receiving the first through eighth subsequent sub beams.

In one aspect, the optical pickup further includes a wiring group that includes signal lines respectively connected to the first through eighth maim beam detectors, the first through fourth precedent sub beam detectors and the first through fourth subsequent sub beam detectors and transmits received light signals used in executing a differential push-pull detection method for a tracking error signal; and a wiring group that includes signal lines respectively connected to the first through eighth main beam detectors and transmits received light signals used in executing a differential phase detection method for a tracking error signal and a spot size detection method for a focus error signal.

In one aspect, the main beam detector, the precedent sub beam detector and the subsequent sub beam detector are formed on a semiconductor substrate, and current-voltage converter circuits for respectively converting current signal outputs from the main beam detector, the precedent sub beam detector and the subsequent sub beam detector into voltage signals and the wiring groups are integrally formed on the semiconductor substrate.

In one aspect, a signal arithmetic circuit that has a function to calculate the tracking error signal by the differential phase detection method and the differential push-pull detection method and the focus error signal and includes adders, subtracters and a multiplier is integrally formed on the semiconductor substrate.

In one aspect, the main beam detector consists of first through eighth main beam detectors for receiving the first through eighth main beams, each of the first through eighth main beam detectors having at least two light receiving portions, the precedent sub beam detector consists of first through fourth precedent sub beam detectors for receiving the first through eighth precedent sub beams, the subsequent sub beam detector consists of first through fourth subsequent sub beam detectors for receiving the first through eighth subsequent sub beams, and the optical pickup further includes a common current-voltage converter circuit for converting, into a voltage signal, current signal outputs from two or more light receiving portions of the first through eighth main beam detectors each having at least the two light receiving portions; and a common current-voltage converter circuit for converting, into a voltage signal, current signal outputs from two or more light receiving portions of the first through fourth precedent sub beam detectors and the first through fourth subsequent sub beam detectors.

BRIEF DESCRIPTION OF THE DRAWINGS

FIG. 5 is a graph for showing the relationship between a shift of a light emitting point and a difference in light quantity;

DETAILED DESCRIPTION OF THE INVENTION

Figure 1:
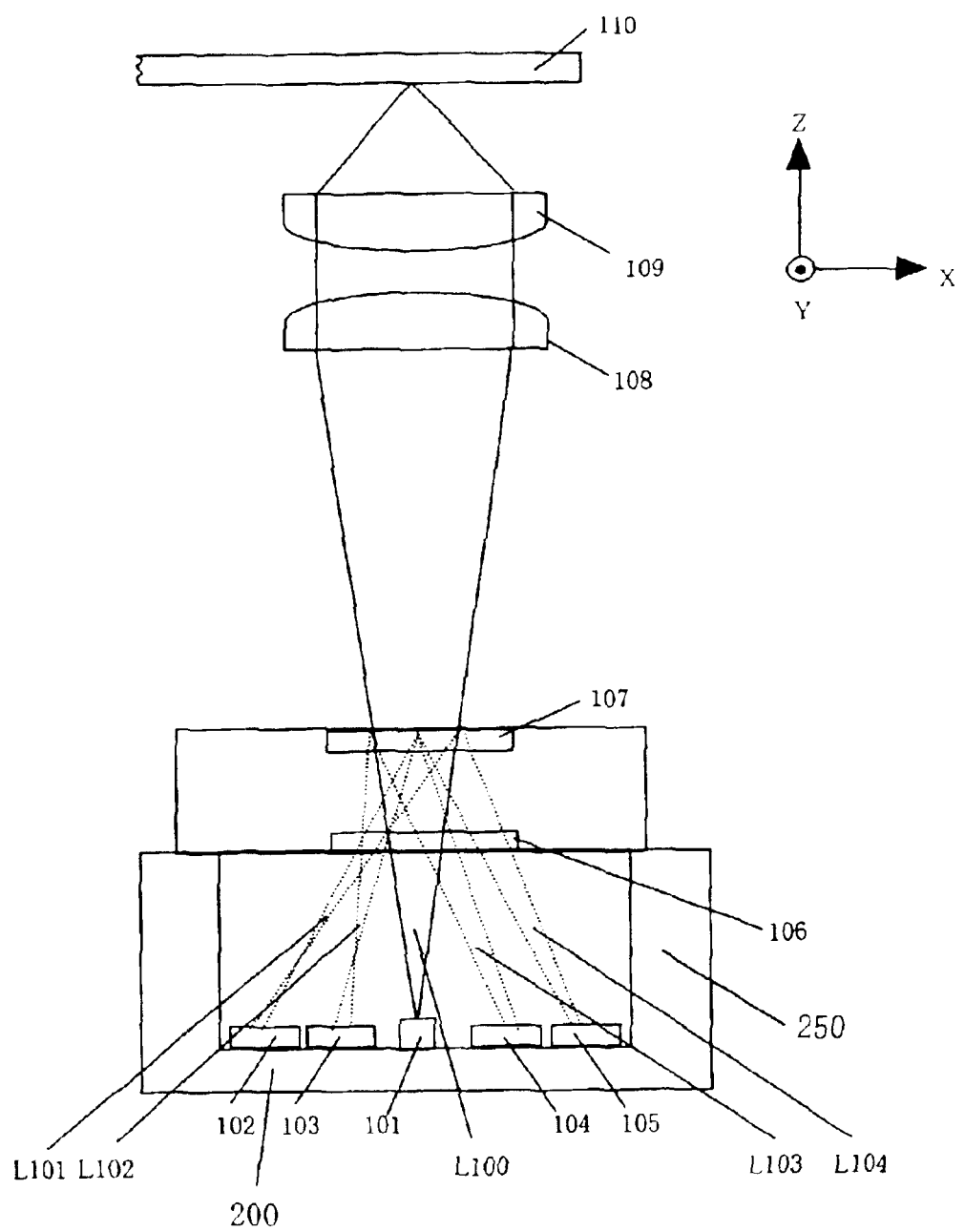
FIG. 1 is a schematic cross-sectional view for showing the architecture of a principal part of an optical system of an optical pickup according to an embodiment of the invention.

A preferred embodiment of the invention will now be described with reference to the accompanying drawings. In the drawings referred to below, constituent elements with a substantially identical function are referred to by using an identical reference numeral for the sake of simplification. It is noted that the following embodiment does not limit the invention.

Figure 2A:
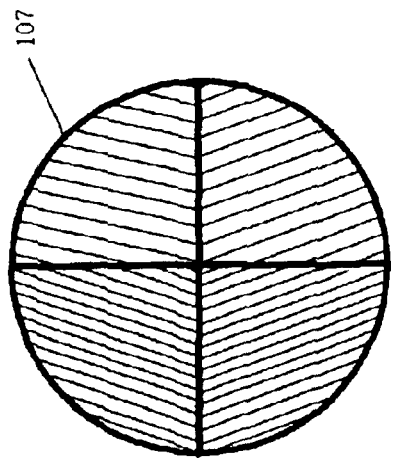
FIGS. 2A and 2B are plan views of a hologram element and photodetectors used in the embodiment of the invention.
Figure 2B:
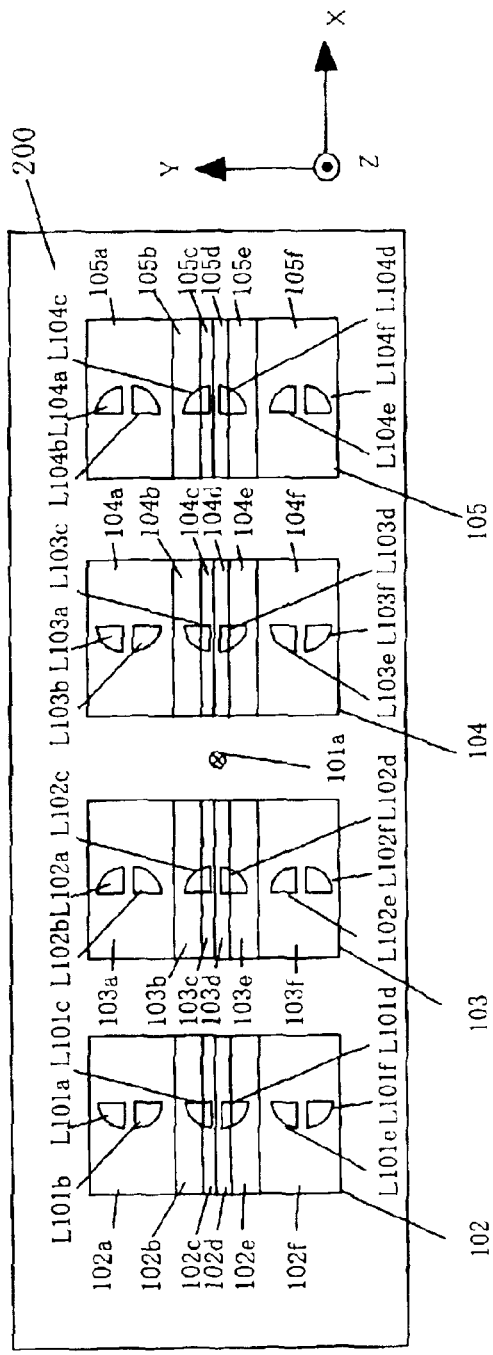

First, FIGS. 1, 2A and 2B are referred to. In xyz coordinates shown in FIGS. 1, 2A and 2B, an identical direction is indicated by using identical axes of the coordinates.

FIG. 1 schematically shows the architecture of an optical pickup according to this embodiment. The optical pickup of FIG. 1 includes a semiconductor laser 101; a diffraction grating 106 for dividing a light beam emitted from the semiconductor laser 101 into a main beam, a precedent sub beam and a subsequent sub beam; and a hologram element 107 for dividing reflected light beams of the main beam, the precedent sub beam and the subsequent sub beam from an optical recording medium 110 respectively into first through eighth main beams, first through eighth precedent sub beams and first through eighth subsequent sub beams. Photodetectors 102, 103, 104 and 105 for receiving the light beams having been divided by the hologram element 107 are disposed on a substrate 200 on which the semiconductor laser 101 is disposed. The photodetectors 102 through 105 of this embodiment are photodiodes formed on the semiconductor substrate (silicon substrate) 200. Alternatively, they may be pin diodes or the like.

Each of the photodetectors 102, 103, 104 and 105 includes a main beam detector for receiving the first through eighth main beams, a precedent sub beam detector for receiving the first through eighth precedent sub beams and a subsequent sub beam detector for receiving the first through eighth subsequent sub beams. In the optical pickup of this embodiment, the semiconductor laser 101, the diffraction grating 106, the hologram element 107 and the photodetectors 102 through 105 (each including the main beam detector, the precedent sub beam detector and the subsequent sub beam detector) are formed as one unit. Also, a wall 250 is provided in the periphery of the semiconductor substrate 200 on which the photodetectors 102 through 105 are formed. Furthermore, as shown in FIG. 1, a collimator lens 108 and an object lens 109 are provided between the hologram element 107 and the optical recording medium 101.

Now, the operation of the optical pickup of this embodiment will be described.

First, an outgoing light beam L100 is emitted from the semiconductor laser 101, and the outgoing light beam L100 passes through the diffraction grating 106 so as to be divided into a main beam and a precedent sub beam (not shown) and a subsequent sub beam (not shown) to be used for detecting a tracking error signal. Subsequently, the main beam, the precedent sub beam and the subsequent sub beam pass through the hologram element 107, are collected by the collimator lens 108 and enter the object lens 109. Thereafter, the resultant beams are collected on the optical recording medium 110 by the object lens 109.

Next, light beams reflected by the optical recording medium 110 enter the hologram element 107 through the aforementioned optical path in the reverse direction. At this point, ±1st-order diffracted light beams (L101, L102, L103 and L104) are generated by the hologram element 107 and respectively enter the photodetectors 102, 103, 104 and 105 to be detected. When the outputs of the photodetectors 102, 103, 104 and 105 are calculated, a servo signal including a focus error signal FE and a tracking error signal TE and an information signal are obtained.

The detailed structures of the hologram element 107 and the photodetectors 102, 103, 104 and 105 are shown in FIGS. 2A and 2B. FIGS. 2A and 2B respectively show the plane structures of the hologram element 107 and the photodetectors 102, 103, 104 and 105 taken along the negative direction of the z-axis of FIG. 1 (namely, a direction from the optical recording medium 110 toward the photodetectors 102, 103, 104 and 105 on the drawing).

The hologram element 107 is a Fresnel zone plate consisting of four areas with a hologram pattern as shown in FIG. 2A. The hologram element 107 of FIG. 2A has a hologram pattern for obtaining beam spots (L101a, L101b and the like) as shown in FIG. 2B.

FIG. 2B shows the positional relationship between an apparent light emitting point 101a of the semiconductor laser 101 and the photodetectors 102, 103, 104 and 105. As shown in FIG. 2B, a detection face of the photodetector 102 is divided into areas 102a, 102b, 102c, 102d, 102e and 102f. A detection face of the photodetector 103 is divided into areas 103a, 103b, 103c, 103d, 103e and 103f. A detection face of the photodetector 104 is divided into areas 104a, 104b, 104c, 104d, 104e and 104f. A detection face of the photodetector 105 is divided into areas 105a, 105b, 105c, 105d, 105e and 105f.

The areas 102b, 102c, 102d, 102e, 103b, 103c, 103d, 103e, 104b, 104c, 104d, 104e, 105b, 103c, 105d and 105e correspond to main beam detectors for detecting the main beam. Also, the areas 102a, 103a, 104a and 105a correspond to precedent sub beam detectors for detecting the precedent sub beam. The areas 102f, 103f, 104f and 105f correspond to subsequent sub beam detectors for detecting the subsequent sub beam. In other words, a main beam detector consists of first through eighth main beam detectors for receiving the first through eighth main beams, and each of the first through eighth main beam detectors has at least two light receiving areas. Furthermore, a precedent sub beam detector consists of first through fourth precedent sub beam detectors for receiving the first through eighth precedent sub beams, and a subsequent sub beam detector consists of first through fourth subsequent sub beam detectors for receiving the first through eighth subsequent sub beams.

As shown in FIG. 1, the ±1st-order diffracted light beams L101, L102, L103 and L104 having been divided by the hologram element 107 respectively enter the photodetectors 102, 103, 104 and 105. On the faces of the photodetectors 102, 103, 104 and 105, the light beams have cross-sections, as shown in FIG. 2B, in the shape of partial circles L101a, L101b, L101c, L101d, L102a, L102b, L102c, L102d, L103a, L103b, L103c, L103d, L104a, L104b, L104c and L104d.

Among them, the cross-sections L101b, L101c, L102b, L102c, L103b, L103c, L104b and L104c correspond to eight spots of the main beam. Also, the cross-sections L101a, L101b, L102a, L102b, L103a, L103b, L104a and L104b correspond to eight spots of the precedent sub beam. Furthermore, the cross-sections L101e, L101f, L102e, L102f, L103e, L103f, L104e and L104f correspond to eight spots of the subsequent sub beam.

Exemplified conditions for the architecture of this embodiment are as follows: The substrate 200 has a dimension of 1 through 3 mm×1 through 3 mm. The detection face of each photodetector has a dimension of 5 through 300 μm×5 through 300 μm. A space between the adjacent photodetectors is 0 through 1 mm. The hologram element 107 has a diameter of 0.3 through 1 mm. The shape of the hologram element 107 is not limited to a circle but may be a tetragon.

In this embodiment, the hologram element 107 is divided into the four areas so as to generate the main beam, the precedent sub beam and the subsequent sub beam. Therefore, even when the eight spots L101a, L101b, L102a, L102b, L103a, L103b, L104a and L104b of the main beam are shifted in the x-direction or the y-direction on the photodetectors, an effect to prevent any light beam from entering an adjacent photodetector can be attained. This effect will be further described with reference to FIGS. 3A, 3B, 4A and 4B.

Figure 3A:
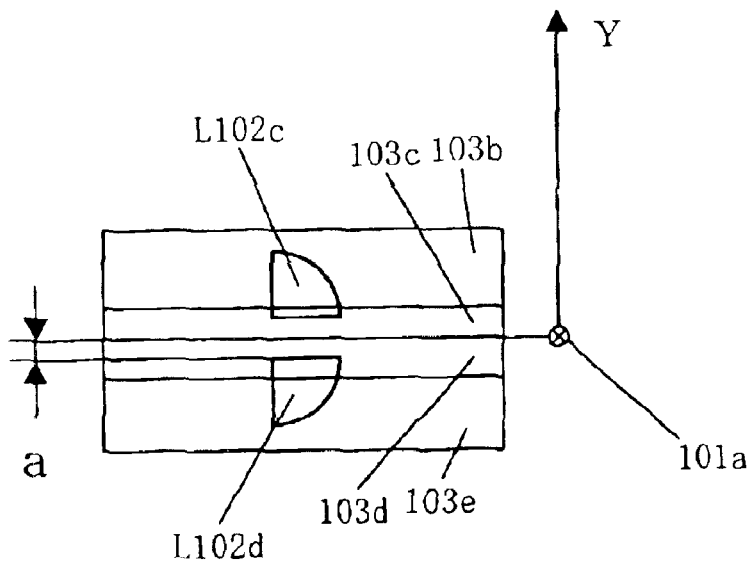
FIGS. 3A and 3B are diagrams for explaining an effect to suppress entry of a light beam.
Figure 3B:
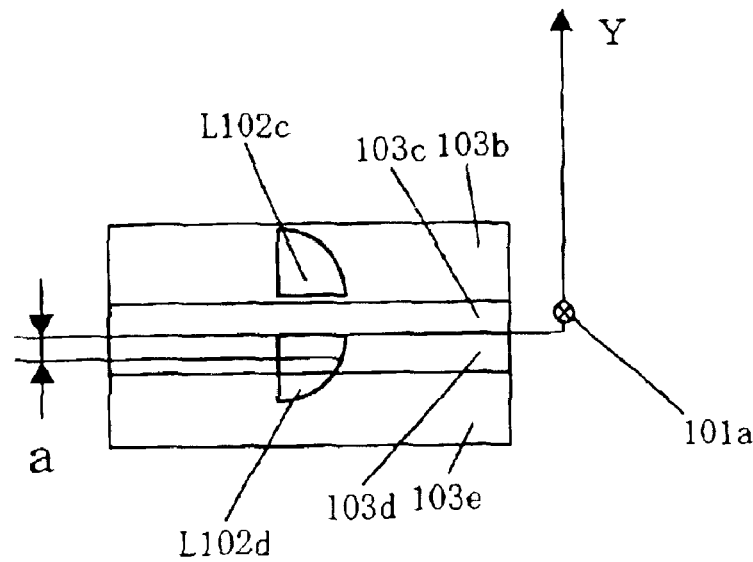
Figure 4A:
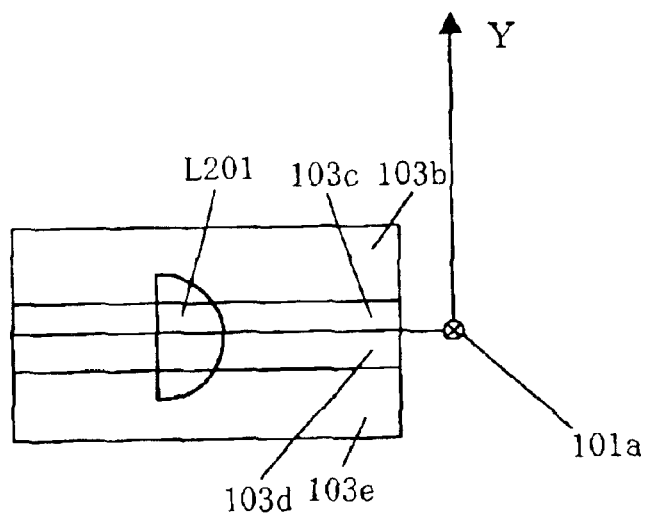
FIGS. 4A and 4B are diagrams for comparing the effect to suppress entry of a light beam.
Figure 4B:
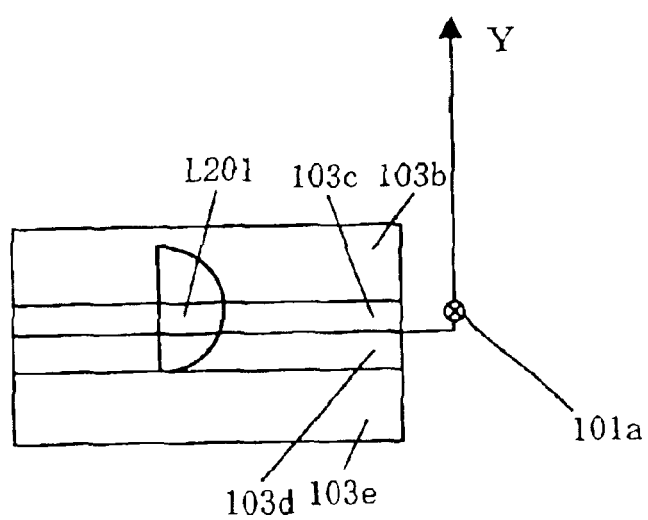

Each of FIGS. 3A, 3B, 4A and 4B shows the areas 103b, 103c, 103d and 103e of the photodetector 103 of FIG. 2B and the apparent light emitting point 101a of the semiconductor laser 101. Each of FIGS. 3A and 3B shows the partial circles L102c and L102d of the 1st-order diffracted light beam L102 from the hologram element 107 of this embodiment while each of FIGS. 4A and 4B shows a partial circle L201 of a 1st-order diffracted light beam obtained when the hologram element 107 of this embodiment is not divided in the y-direction. Each of FIGS. 3A and 4A shows the case where the apparent light emitting point 101a of the semiconductor laser 101 is disposed in a designed position, and each of FIGS. 3B and 4B shows the case where the apparent light emitting point 101a of the semiconductor laser 101 is shifted in the y-direction from the designed position.

As is understood from FIGS. 3A and 3B, even when a shift a is caused in the architecture of this embodiment, the light beam (L102d) does not enter the adjacent photodetector (103c). On the other hand, as is understood from FIG. 4A and 4B, if the hologram element is not divided in the y-direction, even when merely a slight shift is caused, the light beam (that is, a lower portion of the light beam L201) enters the adjacent photodetector (103c).

FIG. 5 shows the relationship between the shift of the light emitting point and a difference in the light quantity obtained in the cases shown in FIGS. 3A and 3B, and 4A and 4B. In more detail, FIG. 5 shows the difference in the light quantity obtained in the areas 103b, 103c, 103d and 103e of the photodetector 103 when the apparent light emitting point 101a of the semiconductor laser 101 is shifted in the y-direction from the designed position. Herein, the difference in the light quantity is calculated merely with respect to a portion corresponding to a tracking signal TE (DPD) obtained in the photodetector 103, which is represented by the following equation:

TE(DPD)=(103b+103c)−(103d+103e)

As is understood from FIG. 5, in the case where the diffracted light beam is not divided as shown in FIGS. 4A and 4B, if the apparent light emitting point is shifted from the designed position, the light quantities (103b+103c) and (103d+103e) received by the light receiving areas are respectively changed in accordance with the shift of the light emitting point. Accordingly, a tracking signal (DPD signal) determined by the difference between the two light quantities is changed, and hence, a malfunction can be easily caused. In other words, even a slight shift of the light emitting point can cause a malfunction, and therefore, the aligning requirements should be very strict, and an allowable range of the shift of the light emitting point is very narrow.

On the other hand, in the case where the diffracted light is divided as in this embodiment as shown in FIGS. 3A and 3B, even when a shift ±a of the light emitting point is caused, it can be dealt with as the allowable range. In other words, the diffracted light beam is divided so as to attain a margin (=a) between the light emitting point and the light receiving area, and even when the apparent light emitting point is shifted from the designed position, the light quantities (103b+103c) and (103d+103e) in the respective areas are not changed until the shift exceeds the margin a. When a tracking signal is not affected by the shift in this manner, a margin against a malfunction can be wide. As a result, the fabrication can be eased, and in addition, the yield can be increased and the fabrication cost can be reduced. In the architecture of this embodiment, the margin a can be, for example, approximately 3 μm through 10 μm.

Furthermore, since the margin can be thus wide, an optical pickup resistant to vibration can be realized. Also, since the semiconductor laser 101, the diffraction grating 106, the hologram element 107 and the photodetectors 102 through 105 (each including the main beam detector, the precedent sub beam detector and the subsequent sub beam detector) are formed as one unit in the optical pickup of this embodiment, the alignment accuracy can be higher than in the case where they are not formed as one unit. Specifically, since these optical components are integrated to be aligned with one another, the alignment accuracy can be higher than in the case where the individual optical components are aligned by adjusting their positions. Furthermore, since the optical pickup is thus formed as one unit, it is resistant to vibration.

The above description of the main beam also applies to the precedent sub beam and the subsequent sub beam. Accordingly, positional margins among the semiconductor laser 101, the photodetectors 102 through 105, the diffraction grating 106, the hologram element 107, the collimator lens 108 and the object lens 109 can be increased.

Since the hologram element 107 of this embodiment is a Fresnel zone plate, each of the diffracted light beams L101 and L102 is converged on a point in front of the apparent light emitting point 101a of the semiconductor laser 101 (namely, on a point away from the apparent light emitting point 101a in the positive direction of the z-axis, that is, in a direction vertically above the face of the drawing). Also, each of the diffracted light beams L103 and L104 is converged on a point behind (that is away from the apparent light emitting point 101a in the negative direction of the z-axis).

A focus error signal FE is detected by a known SSD (spot size detection) method utilizing this difference in the convergence points. Specifically, the focus error signal FE is obtained through calculation of the following equation 3, wherein the reference numerals of the respective detection areas of the photodetectors 102, 103, 104 and 105 are used to indicate output values of the corresponding detection areas:

$$FE = (102c + 102d - 102b - 102e) + \\ (103c + 103d - 103b - 103e) - \\ (104c + 104d - 104b - 104e) - \\ (105c + 105d - 105b - 105e)$$

Equation 3

On the other hand, a tracking error signal TE used in a DVD-ROM or the like is detected by a differential phase detection (DPD) method. Specifically, the tracking error signal TE (DPD) is obtained through calculation of the following equation 4, wherein the reference numerals of the respective detection areas are used to indicate output values of the corresponding detection areas:

$$TE(DPD) = (102d + 102e + 103b + 103c + \\ 104d + 104e + 105b + 105c) - \\ (102b + 102c + 103d + 103e + \\ 104b + 104c + 105d + 105e)$$

Equation 4

Also, a tracking error signal TE used in a DVD-RAM or the like is detected by a differential push-pull detection (DPP) method. Specifically, the tracking error signal TE (DPP) is obtained through calculation of the following equation 5, wherein the reference numerals of the respective detection areas are used to indicate output values of the corresponding detection areas and wherein k is an arbitrary coefficient:

$$TE(DPP) = (103b + 103c + 103d + 103e +$$
$$104b + 104c + 104d + 104e) -$$
$$(102b + 102c + 102d + 102e +$$
$$105b + 105c + 105d + 105e) -$$
$$k((103a + 103f + 104a + 104f) -$$
$$(102a + 102f + 105a + 105f))$$

Equation 5

An information signal (RF) is a sum of the outputs of all the main beam detectors, and is specifically obtained through calculation of the following equation 6, wherein the reference numerals of the respective detection areas are used to indicate the output values of the corresponding detection areas:

$$RF = 102b + 102c + 102d + 102e +$$
$$103b + 103c + 103d + 103e +$$
$$104b + 104c + 104d + 104e +$$
$$105b + 105c + 105d + 105e$$

Equation 6

Figure 6:
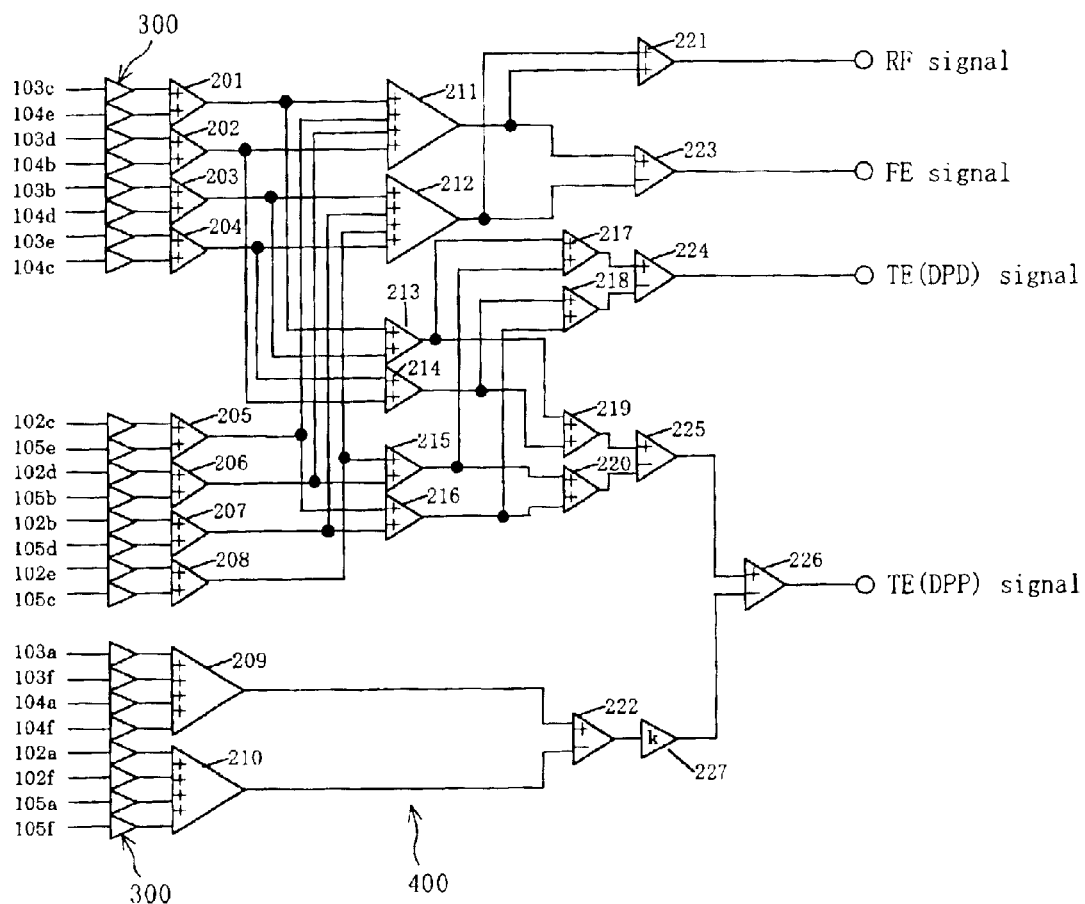
FIG. 6 is a diagram of exemplified wiring configuration among photodetectors, a current-voltage converter circuit and a signal arithmetic circuit employed in the embodiment of the invention.

FIG. 6 shows exemplified wiring configuration between the photodetectors of FIG. 2B and a current-voltage converter circuit 300 and a signal arithmetic circuit 400. In FIG. 6, reference numerals 201 through 221 denote adders, reference numerals 222 through 226 denote subtracters, and a reference numeral 227 denotes a k-times multiplier. The signal arithmetic circuit 400 consists of these adders, subtracters and multiplier. In FIG. 6, terminals of the photodetectors 102 through 105 are indicated by using the reference numerals used for the respective detection areas of FIG. 2B.

In this embodiment, a signal from an optical recording medium is received by the photodetectors 102 through 105, and current outputs from the photodetectors 102 through 105 are converted by the respective current-voltage converter circuits 300 into voltage signals to be output. The focus error signal FE, the tracking error signal obtained by the differential phase detection (DPD) method, the tracking error signal obtained by the differential push-pull detection (DPP) method and the information signal RF can be calculated by combining the adders 201 through 221, the subtracters 222 through 226 and the multiplier 227 of FIG. 6.

In other words, the configuration shown in FIG. 6 includes a wiring group consisting of signal lines respectively connected to the first through eighth main beam detectors, the first through fourth precedent sub beam detectors and the first through fourth subsequent sub beam detectors for transmitting received light signals used for executing the differential push-pull detection method; and a wiring group consisting of signal lines respectively connected to the first through eighth main beam detectors for transmitting received light signals used for executing the differential phase detection method. Furthermore, it includes the current-voltage converter circuits 300 for converting the current signals from the photodetectors into voltage signals and the signal arithmetic circuit 400. For downsizing the whole device, these wiring groups, the current-voltage converter circuits 300 and the signal arithmetic circuit 400 are preferably integrated on the semiconductor substrate 200 of FIG. 2B.

Figure 7:
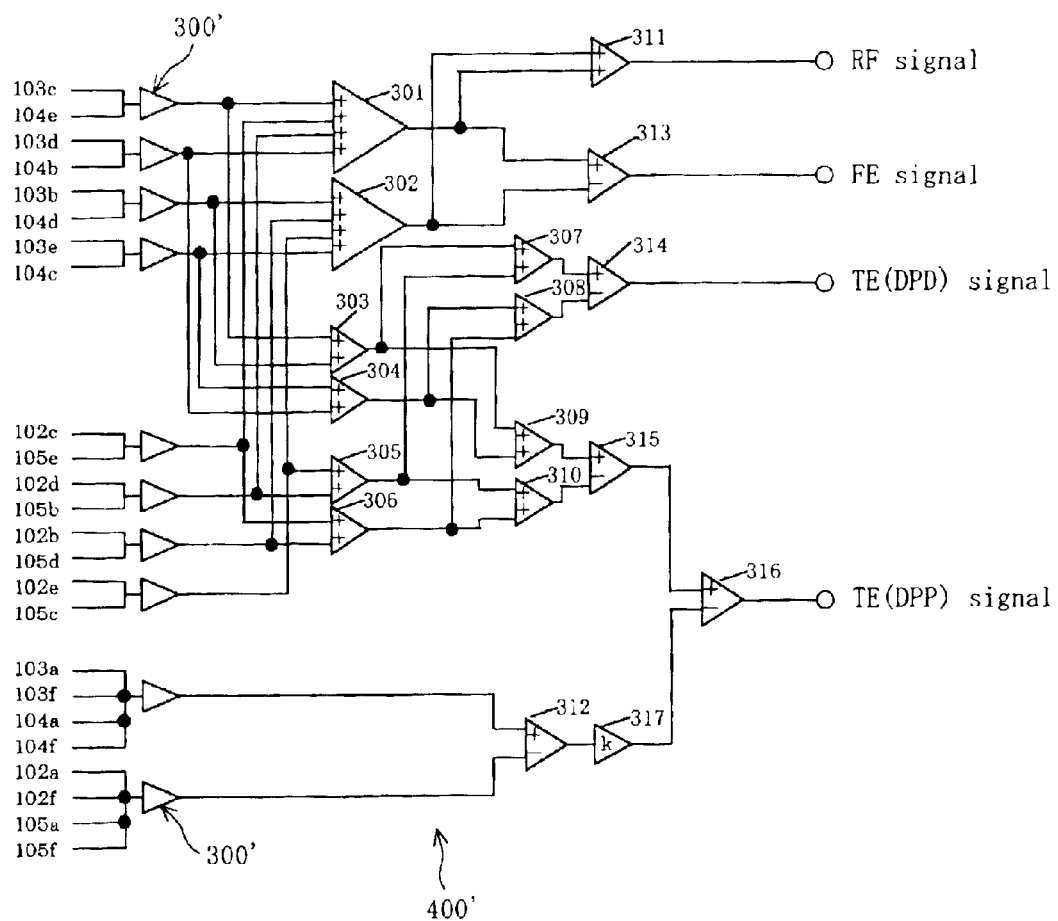
FIG. 7 is a diagram of another exemplified wiring configuration in which the current-voltage converter circuit and the signal arithmetic circuit of FIG. 6 are simplified.
Figure 8:
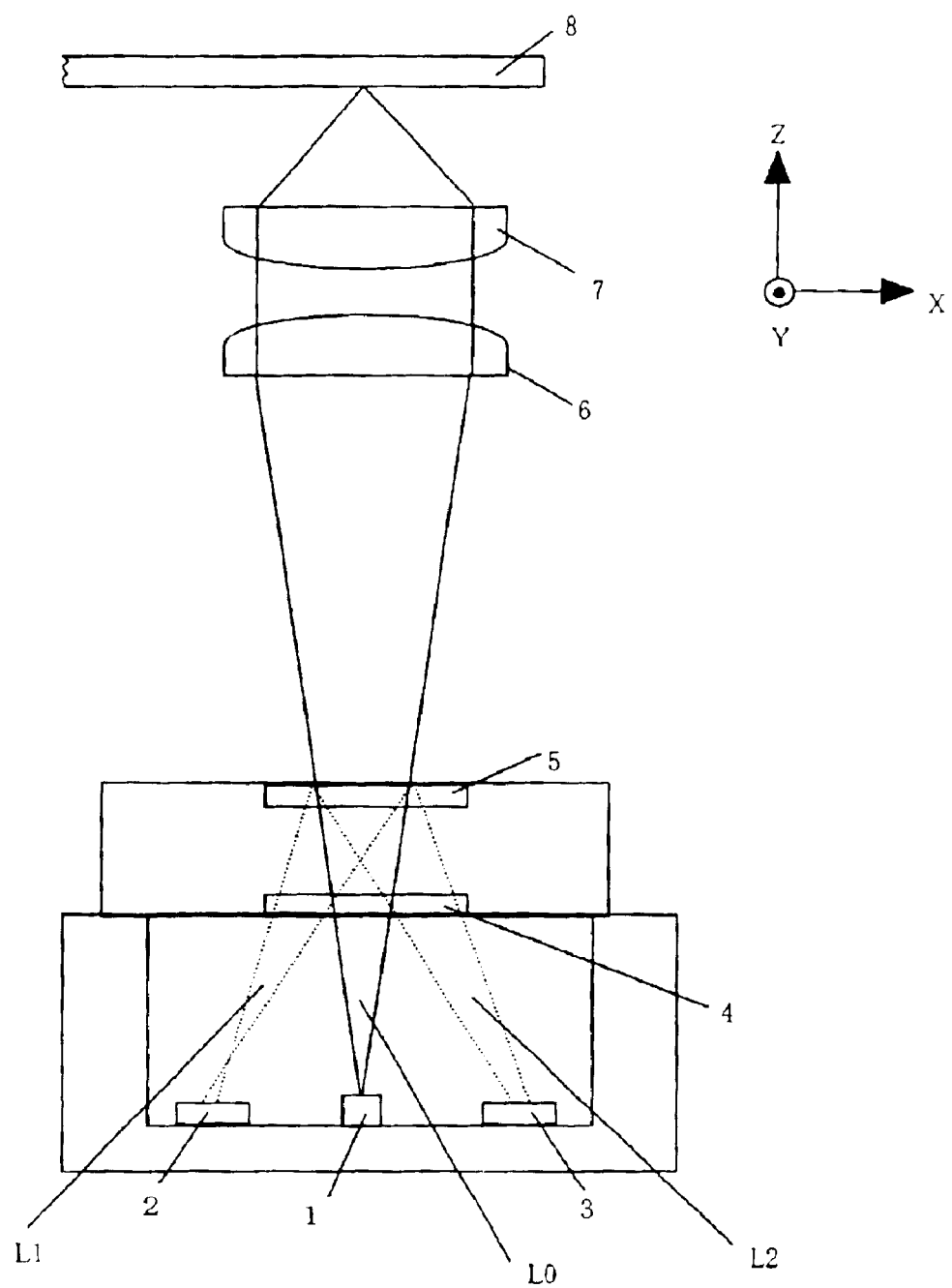
FIG. 8 is a schematic cross-sectional view for showing the architecture of a principal part of an optical system of a conventional optical pickup.
Figure 9A:
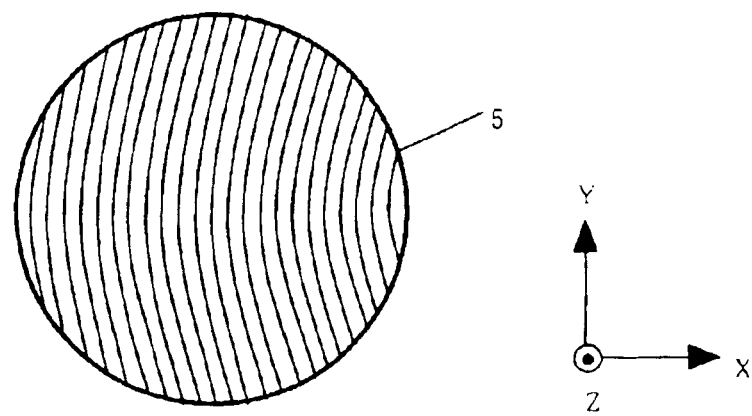
FIGS. 9A and 9B are plan views of a conventional hologram element and conventional photodetectors.
Figure 9B:
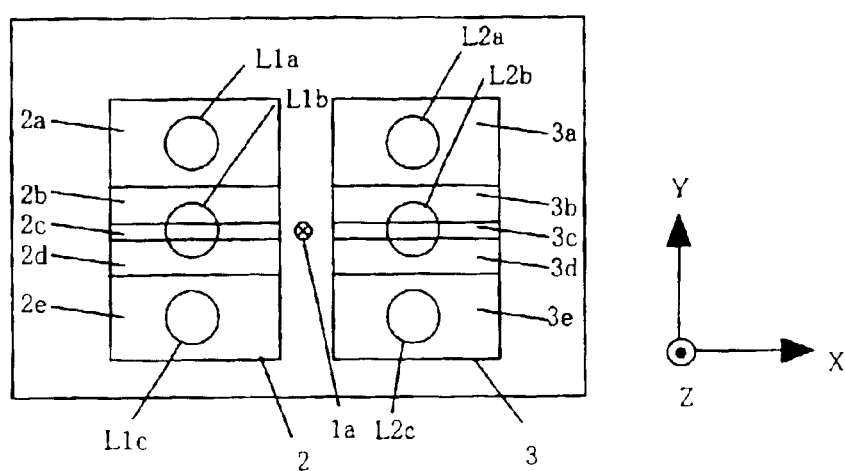

The exemplified wiring configuration shown in FIG. 6 can be modified as shown in FIG. 7. The wiring configuration of FIG. 7 is obtained by simplifying the current-voltage converter circuits 300 and the signal arithmetic circuit 400 of FIG. 6. A current-power converter circuit 300' of FIG. 7 is a common current-voltage converter circuit. In more detail, the current-power converter circuit 300' of FIG. 7 is a common current-voltage converter circuit for converting current signals output from two or more of light receiving areas of the first through eighth main beam detectors into voltage signals and a common current-voltage converter circuit for converting current signals output from two or more of light receiving areas of the first through fourth precedent sub beam detectors and the first through fourth subsequent sub beam detectors into voltage signals. This current-power converter circuit 300' is connected to a corresponding signal arithmetic circuit 400'. In FIG. 7, reference numerals 301 through 311 denote adders, reference numerals 312 through 316 denote subtracters and a reference numeral 316 denotes a k-times multiplier. Similarly to FIG. 6, the terminals of the photodetectors 102 through 105 are indicated by using the reference numerals used for the respective detection areas of FIG. 2B.

In this case, a signal from an optical recording medium is received by the photodetectors 102 through 105, and the current outputs from the photodetectors 102 through 105 are converted by current-voltage converter circuits each corresponding to a combination of two or more detectors as shown in FIG. 7 into voltage signals to be output. The focus error signal FE, the tracking error signal obtained by the differential phase detection (DPD) method, the tracking error signal obtained by the differential push-pull detection (DPP) method and the information signal RF can be calculated by combining the adders 301 through 311, the subtracters 312 through 316 and the multiplier 317 of FIG. 7. In this configuration, the circuit can be simplified as compared with that shown in FIG. 6.

As described above, for downsizing the whole device and simplifying the whole configuration, the photodetectors 102 through 105 and the current-voltage converter circuits 300 (or 300') shown in FIG. 6 or 7 are preferably formed as one unit on the semiconductor substrate 200 for fabricating the optical pickup, but at least one of these circuits may be disposed in a portion other than the semiconductor substrate 200. Alternatively, any of the adders, the subtracters and the multiplier can be formed as one unit on the semiconductor substrate 200 for fabricating the optical pickup.

Furthermore, the semiconductor laser 101 may be mounted on the semiconductor substrate 200 to be assembled in one package together with the diffraction grating 106 and the hologram element 107 both formed from the same glass or polymer material. Thus, the optical pickup can be realized by using a hologram unit.

The optical pickup according to the embodiment of the invention is applicable as any type of optical pickups to any of a read-only optical recording medium, a write-once-read-many optical recording medium and a rewritable optical recording medium.

While the present invention has been described in a preferred embodiment, it will be apparent to those skilled in the art that the disclosed invention may be modified in numerous ways and may assume many embodiments other than that specifically set out and described above.

According to the invention, the optical pickup includes the hologram element for dividing a light beam into the first through eighth main beams, the first through eighth precedent sub beams and the first through eighth subsequent sub beams; the main beam detectors for receiving the first through eighth main beams; the precedent sub beam detectors for receiving the first through eighth precedent sub beams; the subsequent sub beam detectors for receiving the first through eighth subsequent sub beams. In addition, the semiconductor laser, the diffraction grating, the hologram element, the main beam detectors, the precedent sub beam detectors and the subsequent sub beam detectors are formed as one unit. Accordingly, the optical pickup can perform a reproducing or recording operation regardless of the recording format of an optical recording medium and can suppress the problem of the positional shift of a light spot.

What is claimed is:

1. An optical pickup comprising:

a semiconductor laser;

a diffraction grating for dividing a light beam emitted by said semiconductor laser into a main beam, a precedent sub beam and a subsequent sub beam;

a hologram element for dividing reflected light beams of said main beam, said precedent sub beam and said subsequent sub beam from an optical recording medium respectively into first through eighth main beams, first through eighth precedent sub beams and first through eighth subsequent sub beams;

a main beam detector for receiving said first through eighth main beams;

a precedent sub beam detector for receiving said first through eighth precedent sub beams; and a subsequent sub beam detector for receiving said first through eighth subsequent sub beams, wherein said semiconductor laser, said diffraction grating, said hologram element, said main beam detector, said precedent sub beam detector and said subsequent sub beam detector are integrally formed.

2. The optical pickup of claim 1, wherein said main beam detector consists of first through eighth main beam detectors for receiving said first through eighth main beams, and each of said first through eighth main beam detectors has at least two light receiving portions.

3. The optical pickup of claim 2, wherein said precedent sub beam detector consists of first through fourth precedent sub beam detectors for receiving said first through eighth precedent sub beams, and said subsequent sub beam detector consists of first through fourth subsequent sub beam detectors for receiving said first through eighth subsequent sub beams.

4. The optical pickup of claim 3, further comprising:

a wiring group which includes signal lines respectively connected to said first through eighth maim beam detectors, said first through fourth precedent sub beam detectors and said first through fourth subsequent sub beam detectors and transmits received light signals used in executing a differential push-pull detection method for a tracking error signal; and a wiring group which includes signal lines respectively connected to said first through eighth main beam detectors and transmits received light signals used in executing a differential phase detection method for a tracking error signal and a spot size detection method for a focus error signal.

5. The optical pickup of claim 4, wherein said main beam detector, said precedent sub beam detector and said subsequent sub beam detector are formed on a semiconductor substrate, and current-voltage converter circuits for respectively converting current signal outputs from said main beam detector, said precedent sub beam detector and said subsequent sub beam detector into voltage signals and said wiring groups are integrally formed on said semiconductor substrate.

6. The optical pickup of claim 5, wherein a signal arithmetic circuit that has a function to calculate the tracking error signal by the differential phase detection method and the differential push-pull detection method and the focus error signal and includes adders, subtracters and a multiplier is integrally formed on said semiconductor substrate.

7. The optical pickup of claim 1, wherein said main beam detector consists of first through eighth main beam detectors for receiving said first through eighth main beams, each of said first through eighth main beam detectors having at least two light receiving portions, said precedent sub beam detector consists of first through fourth precedent sub beam detectors for receiving said first through eighth precedent sub beams, said subsequent sub beam detector consists of first through fourth subsequent sub beam detectors for receiving said first through eighth subsequent sub beams, and said optical pickup further comprises:

a common current-voltage converter circuit for converting, into a voltage signal, current signal outputs from two or more light receiving portions of said first through eighth main beam detectors each having at least said two light receiving portions; and a common current-voltage converter circuit for converting, into a voltage signal, current signal outputs from two or more light receiving portions of said first through fourth precedent sub beam detectors and said first through fourth subsequent sub beam detectors.

* * * * *